United States Patent [19]
Fotouhi

[11] Patent Number: 5,790,393
[45] Date of Patent: Aug. 4, 1998

[54] VOLTAGE MULTIPLIER WITH ADJUSTABLE OUTPUT LEVEL

[75] Inventor: Bahram Fotouhi, Cupertino, Calif.

[73] Assignee: Exar Corporation, Fremont, Calif.

[21] Appl. No.: 787,416

[22] Filed: Jan. 22, 1997

[51] Int. Cl.⁶ .................................................. H02M 3/18
[52] U.S. Cl. ........................ 363/60; 307/110; 327/536; 327/589
[58] Field of Search ...................... 307/109, 110; 363/59, 60; 327/536, 589

[56] References Cited

U.S. PATENT DOCUMENTS

| | | | |
|---|---|---|---|
| 4,636,930 | 1/1987 | Bingham et al. | 363/60 |
| 4,679,134 | 7/1987 | Bingham et al. | 363/61 |
| 4,777,577 | 10/1988 | Bingham et al. | 363/60 |
| 4,797,899 | 1/1989 | Fuller et al. | 375/7 |
| 4,809,152 | 2/1989 | Bingham et al. | 363/61 |
| 4,897,774 | 1/1990 | Bingham et al. | 363/61 |
| 4,999,761 | 3/1991 | Bingham et al. | 363/60 |
| 5,111,375 | 5/1992 | Marshall | 363/60 |
| 5,258,662 | 11/1993 | Skovmand | 307/296.3 |
| 5,426,334 | 6/1995 | Skovmand | 327/427 |
| 5,550,728 | 8/1996 | Ellis | 363/60 |

*Primary Examiner*—Peter S. Wong
*Assistant Examiner*—Sharon Riley
*Attorney, Agent, or Firm*—Townsend and Townsend and Crew

[57] ABSTRACT

A circuit and method for generating a fractional multiple of a primary power supply voltage is disclosed. The circuit operates in two phases wherein during a first phase a first capacitor is charged to the primary power supply voltage Vdd, and during a second phase the voltage on the first capacitor is bootstrapped toward twice the power supply voltage. A second capacitor, however, is coupled in parallel to the first capacitor during the second phase to cause charge sharing. The circuit can thus generate a fractional voltage between Vdd and 2 Vdd without the need for any voltage regulator circuitry.

15 Claims, 1 Drawing Sheet

1

VOLTAGE MULTIPLIER WITH ADJUSTABLE OUTPUT LEVEL

BACKGROUND OF THE INVENTION

The present invention relates generally to integrated circuits and in particular to a voltage multiplier circuit with an adjustable output level.

Many electronic systems require more than a single power supply voltage level for operation. For example, certain types of non-volatile memory circuits that may typically use a single 5 volt supply as the primary source of power, often also require higher voltages of, e.g., 10 to 15 volts for programming or erasing functions. Similarly, circuits developed for use in communication and networking systems often require voltages other than the primary supply voltage to, for example, meet certain interface specifications.

Depending on the power requirements of such secondary supply voltages, it is desirable to generate them internally from the primary power supply. This eliminates the need for additional externally provided power supplies. To this end, voltage multiplying or charge pump circuits have been developed that generate the higher voltages from the primary supply voltage.

Charge pump circuits take advantage of the charge storing capability of capacitors to, for example, double the level of a primary supply voltage by bootstrapping. A typical example of a charge pump circuit for use in communication circuits is disclosed in U.S. Pat. No. 4,797,899. There, a network of switches and capacitors operate to generate voltages twice that of the primary Vdd supply in both positive (+2 Vdd) and negative (−2 Vdd) directions.

While such techniques have successfully produced a fixed full integer multiple of the primary supply voltage, generating an adjustable fraction of the supply voltage has been more difficult. For example, using the conventional method disclosed in the above referenced U.S. patent to produce 1.5 Vdd instead of 2 Vdd would first require generating 0.5 Vdd. However, the 0.5 Vdd source must exhibit very low output impedance. This eliminates the conventional method of using a resistive voltage divider to divide the power supply voltage level by half. More commonly, to generate a stable secondary supply voltage that is a fraction of the primary supply voltage, external power supply regulator circuitry with buffered output is used. The resulting overall circuitry is usually more complex, is larger in size, and often requires additional pins on the part.

There is, therefore, a need for a more cost effective and efficient means of generating a secondary supply voltage that is a fractional multiple of a primary supply voltage.

SUMMARY OF THE INVENTION

The present invention provides a method and circuitry for voltage multiplication capable of generating an output voltage that can be programmably adjusted to any level between one to two times the primary supply voltage level, or any other multiple of the primary supply voltage level. The circuit of the present invention can generate a stable supply voltage of, for example, 1.5 times the primary supply voltage without any need for voltage regulator circuitry. Broadly, the voltage multiplying circuit of the present invention generates fractional voltages by adding a capacitor across a switch transistor such that during one clock phase it is parallel-coupled to another capacitor causing a charge sharing to occur. The amount of charge sharing and thus the final value of the output is adjusted by the size ratio of the two capacitors. The present invention achieves this very efficiently without requiring additional pins or extra circuitry.

Accordingly, in one embodiment, the present invention provides a voltage multiplying circuit having first and second switch transistors serially coupled between a first and a second reference voltages, third and fourth switch transistors serially coupled between the second reference voltage and an output terminal, and a first capacitor having first and second terminals coupled across the second and third switch transistors, a second capacitor having first and second terminals coupled across the output terminal and the first reference voltage, and a third capacitor having first and second terminals coupled across the third switch transistor. The switch transistors receive at their control terminals clock signals of different phases, and operate such that during a given clock phase, the first and third capacitors are coupled in parallel and share charge to arrive at a voltage level between the first and second reference voltages.

In another embodiment, the present invention provides a method for generating a fractional multiple of a primary voltage source including the steps of: during a first clock phase; charging a first plate of a first capacitor to a voltage level of the primary voltage source, and discharging a second capacitor; and during a second clock phase; bootstrapping a voltage level on the first plate of the first capacitor by charging a second plate of the first capacitor to the voltage level of the primary voltage source, dividing the voltage level on the first plate of the first capacitor by coupling the second capacitor in parallel to the first capacitor, and transferring the voltage level on the first plate of the first capacitor to a third capacitor.

A better understanding of the nature and advantages of the present invention may be had with reference to the detailed description and the drawing below.

DESCRIPTION OF THE PREFERRED EMBODIMENT

Figure 1:
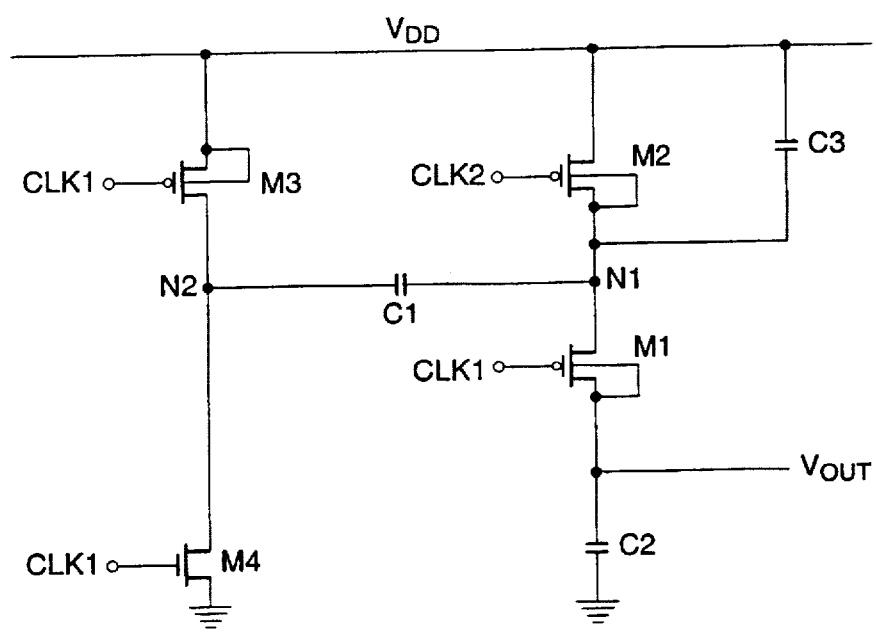
FIG. 1 is a circuit schematic of the voltage multiplier with adjustable output according to a preferred embodiment of the present invention.

Referring to FIG. 1, there is shown a circuit schematic of the voltage multiplier according to a preferred embodiment of the present invention. A first pair of transistors including NMOS transistor M4 and PMOS transistor M3 connect in series between the primary power supply voltage Vdd and ground. A second pair of transistors including PMOS transistor M2 and PMOS transistor M1 connect in series between Vdd and the output terminal Vout of the circuit. A first capacitor C1 connects the common node N2 between transistors M3 and M4 to the common node N1 between transistors M2 and M1. A second transistor C2 connects from output node Vout to ground, and a third capacitor C3 connects between Vdd and node N1. In the embodiment shown in FIG. 1, an N-type well region (not shown) forms the body of PMOS transistors M1, M2, and M3. In the case of PMOS transistor M1, the body of the transistor connects to output node Vout, the body of PMOS transistor M2 connects to node N1 and the body of PMOS transistor M3 connects to Vdd. The gate terminals of the transistors receive non-overlapping clock signals CLK1 and CLK2 as shown. Oscillator circuitry can be used to generate the non-overlapping clock signals CLK1 and CLK2. The drivers for the signals CLK1 and CLK2 are powered by the higher voltage secondary power signal at the output terminal Vout. This enables CLK1 and CLK2 signals to have high enough voltages to turn the transistors on and off.

The circuit of FIG. 1 operates in two phases CLK1 and CLK2 as follows. When CLK1 is at a high level, NMOS transistor M4 is turned on, and PMOS transistors M3 and M1 are turned off. On the other hand, with CLK2 being at a low level, PMOS transistor M2 is turned on. Thus, during this clock phase, capacitor C1 is effectively connected between Vdd (through M2) and ground (through M4). Node N1 is therefore charged up to Vdd. Also, capacitor C3 is shorted by the on resistance of PMOS transistor M2, and is therefore discharged.

During the second phase, CLK1 is low and CLK2 is high. Under this condition, transistors M1 and M3 are turned on while transistors M2 and M4 are turned off. This connects node N2 to Vdd which charges the N2 plate of capacitor C1 to Vdd. The other plate of capacitor C1 at node N1, which was charged to Vdd at the end of the previous phase, is now bootstrapped toward 2 Vdd. However, during this second phase (CLK2) capacitor C3 is connected in parallel with capacitor C1. This causes a charge sharing between capacitors C1 and C3. The potential at node N1 thus exponentially charges to a final value given by:

$$V(N1)=Vdd*[1+1/(1+C3/C1)]$$

With transistor M1 turned on, the voltage at node N1 is transferred to Vout. Accordingly, by adjusting the value of the ratio given by C3/C1, this circuit can generate any output voltage level between Vdd and 2 Vdd.

The performance of this circuit is sensitive to the size of the load it has to drive and the clock frequency. As the load current steels charge from capacitor C2, the output voltage Vout droops, reducing the DC level at the output. Larger load currents cause larger droop. The amount of this droop is given by:

$$\Delta V_D = (I_L * T)/C1,$$

where, $I_L$ is the load current, T is the clock period and C1 is the switching capacitor C1 of FIG. 1. As an example, given a load current of 1 mA, with a clock frequency of 1 MegHz (i.e., T=1 µsec.), and a 1 µF capacitor C1, Vout will exhibit 1 mV of droop.

Furthermore, capacitor C2 acts as a holding capacitor during one phase of the clock (CLK1), and is charged during the other phase (CLK2). Thus, while during the holding phase the droop is linear, the overall shape of the output voltage exhibits a ripple. The magnitude of the ripple is given by:

$$\Delta V_R = (I_L * T)/C2,$$

To attain equal ripple and droop, this circuit is designed with capacitors C1 and C2 having equal values. These capacitors are large enough to preclude internal implementation and are instead implemented external to the integrated circuit chip. This requires nodes N1, N2, and Vout to be made available on dedicated pins to externally connect capacitors C1 and C2. It is an advantage of the circuit of the present invention, that the addition of C3 does not require an additional dedicated pin. Capacitor C3 can be conveniently connected between node N1, that is already available on a pin, and the Vdd pin. Since C1, C2, and C3 are provided externally, the designer can readily adjust not only the amount of ripple and droop of Vout, but its final value. If desired, the ratio C3/C1 can be made digitally programmable by internal or external switches that connect smaller units of capacitance in parallel to one or the other, or both. This will enable the same chip to programmably generate from, for example, a single 3 volt supply, variable voltages of, for example, 4.5 volts, 5 volts, or 6 volts. Further, it will be apparent to those skilled in the art that by using the technique of the present invention, negative fractional multiples of the primary voltage can also be generated by inverting the output.

In conclusion, the present invention offers an efficient and cost effective method for generating a fractional multiple of a single power supply voltage. A novel network of capacitors and switches combine bootstrapping and charge sharing actions during two phases of a clock to arrive at any voltage level between the power supply Vdd and 2 Vdd. While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents.

What is claimed is:

1. A voltage multiplying circuit comprising:

first and second switch transistors serially coupled between first and second reference voltages;

third and fourth switch transistors serially coupled between said second reference voltage and an output terminal;

a first capacitor having first terminal coupled to a common node between said first and second switch transistors, and a second terminal coupled to a common node between said third and fourth switch transistors;

a second capacitor having a first terminal coupled to said output terminal, and a second terminal coupled to said first reference voltage; and a third capacitor having a first terminal coupled to said common node between said third and fourth switch transistors, and a second terminal coupled to said second reference voltage, wherein, by controlling an on/off timing of said switch transistors, and adjusting a size ratio of said third capacitor to said first capacitor, an output voltage level greater than a level of said second reference voltage and less than twice said level of said reference voltage can be generated at said output terminal.

2. The voltage multiplying circuit of claim 1 wherein the control signals to the first, second, third, and fourth switch transistors are driven by one of a first or second clock signal, wherein further the first clock signal has an opposite polarity to the second clock signal.

3. The voltage multiplying circuit of claim 2 wherein said first switch transistor is an N-channel MOS transistor, and each of said second, third, and fourth transistors is a P-channel MOS transistor.

4. The voltage multiplying circuit of claim 3 wherein said opposite polarity clock signals comprise non-overlapping clock signals of CLK1 and CLK2 having opposite polarity.

5. The voltage multiplying circuit of claim 4 wherein said first, second and fourth switch transistors each receive CLK1 at a respective gate terminal, and said second switch transistor receives CLK2 at a gate terminal.

6. The voltage multiplying circuit of claim 5 wherein said first reference voltage is ground and said second reference voltage is a primary power supply for the circuit.

7. A voltage multiplying circuit coupled between a power supply voltage and ground and having an output terminal comprising:

a first MOS transistor having a first source/drain terminal coupled to the output terminal, a second source/drain terminal coupled to a first node N1, and a gate terminal coupled to a first clock signal;

a second MOS transistor having a first source/drain terminal coupled to said first node N1, a second source/drain terminal coupled to the power supply voltage, and a gate terminal coupled to a second clock signal;

a third MOS transistor having a first source/drain terminal coupled to the power supply voltage, a second source/drain terminal coupled to a second node N2, and a gate terminal coupled to said first clock signal;

a fourth MOS transistor having a first source/drain terminal coupled to the second node N2, a second source/drain terminal coupled to ground and a gate terminal coupled to said first clock signal;

a first capacitor having a first terminal coupled to said node N1 and a second terminal coupled to said node N2;

a second capacitor having a first terminal coupled to the output terminal and a second terminal coupled to ground; and a third capacitor having a first terminal coupled to said first node N1, and a second terminal coupled to the power supply voltage.

8. The voltage multiplying circuit of claim 7 wherein said first, second and third MOS transistors are of a P-channel type, and said fourth transistor is of an N-channel type.

9. The voltage multiplying circuit of claim 8 wherein said first and second clock signals are of opposite polarity.

10. A method for generating a fractional multiple of a primary voltage source comprising the steps of:

during a first clock phase:
charging a first plate of a first capacitor to a voltage level of the primary voltage source; and
discharging a second capacitor;

during a second clock phase:
bootstrapping a voltage level on said first plate of said first capacitor by charging a second plate of said first capacitor to said voltage level of the primary voltage source;
dividing said voltage level on said first plate of said first capacitor by coupling said second capacitor in parallel to said first capacitor; and
transferring said voltage level on said first plate of said first capacitor to a third capacitor.

11. The method of claim 10 wherein said step of charging comprises the step of coupling said first plate of said first capacitor to the primary voltage source and a second plate of said first capacitor to ground to charge said first plate to a voltage level of the primary voltage source.

12. The method of claim 11 wherein said step of discharging comprises a steps of substantially shorting a first and a second plate of said second capacitor.

13. The method claim 12 wherein said step of bootstrapping comprises a step of coupling said second plate of said first capacitor to the primary voltage source to bootstrap a voltage level on said first plate of said first capacitor toward twice said voltage level of the primary voltage supply.

14. The method of claim 13 wherein said step of dividing comprises a step of coupling said second capacitor in parallel with said first capacitor to cause a charge sharing between said first and second capacitors.

15. The method of claim 14 further comprising a step of repeating said first clock phase and said second clock phase.

* * * * *